United States Patent
Baldratti et al.

[15] 3,674,817
[45] July 4, 1972

[54] NITRO-STEROIDS AND PROCESS FOR THEIR PREPARATION

[72] Inventors: Giuliana Baldratti; Alberto Consonni; Roberto Sciaky, all of Milan, Italy

[73] Assignee: Societa Farmaceutici Italia, Milan, Italy

[22] Filed: June 8, 1970

[21] Appl. No.: 44,629

[30] Foreign Application Priority Data

June 11, 1969 Italy ................................18045 A/69

[52] U.S. Cl. ......................................260/397.4, 260/397.5
[51] Int. Cl. .........................................C07c 169/32
[58] Field of Search .................. Machine Searched Steroids; 260/397.4, 397.5

[56] References Cited

OTHER PUBLICATIONS

" Journal of American Chemical Soc." (1959) Vol. 81, pp. 3707– 3709 by Bowers et al.

Primary Examiner—Elbert L. Roberts
Attorney—Curt M. Avery, Arthur E. Wilfond, Herbert L. Lerner and Daniel J. Tick

[57] ABSTRACT

Some 7ξ-nitro-1,3,5(10)-estratrienes and a process for their preparation. The compounds inhibit gonatropin and ovulation both orally and parenterally.

16 Claims, No Drawings

NITRO-STEROIDS AND PROCESS FOR THEIR PREPARATION

Our invention relates to nitro-steroids and to a process for their preparation. The compounds are pharmacologically active 7 ξ-nitro-1,3,5(10)-estratrienes of the formula:

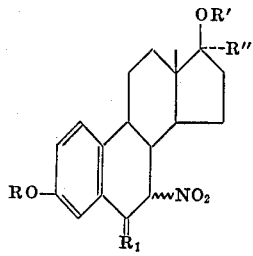

wherein

R is selected from the group consisting of hydrogen, alkyl having from one to four carbon atoms, an ω-halogenated alkyl radical having from one to two carbon atoms, a cycloaliphatic radical having from five to six carbon atoms, an aliphatic acyl radical having from one to four carbon atoms and a cycloaliphatic acyl radical having from five to eight carbon atoms;

R' is selected from the group consisting of hydrogen, an aliphatic acyl radical having from one to four carbon atoms and a cycloaliphatic acyl radical having from five to eight carbon atoms.

R'' is selected from the group consisting of hydrogen, ethynyl, and butynyl;

OR' and R'' may be together =O $R_1$ is selected from the group consisting of

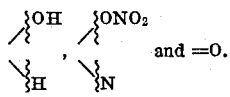

The compounds may be prepared by a process according to our invention starting from steroids wherein the A ring is aromatic and has a double bond in 6 position. More particularly, a compound of the formula:

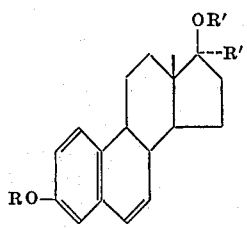

wherein R, R' and R'' have the above mentioned meaning, dissolved in a suitable solvent such as diisopropylether, dioxane and ethyl ether, is reacted with a nitrating agent selected from the group consisting of fuming nitric acid and nitrogen dioxide at a temperature of from −20° to 5° C and under anhydrous atmosphere. After neutralization of the solution, by adding sodium bicarbonate, consisting of one or more 7 ξ-nitro-estratrienes the mixture is extracted with an organic suitable solvent such as ethyl acetate, ethyl ether and benzene and the product obtained is subsequently separated by chromatography.

The above mentioned 7ξ-nitro-estratrienes display an interesting estrogen activity and consequently may be employed to inhibit gonatropin and ovulation. One of their characteristics, which is to be emphasized, is that they are active both orally and parenterally. This property is not found in any of the estrogen steroids usually employed in therapy and particularly in those compounds lacking in the alkyl group in 17 position. The estrogenic activity has been tested in oophorectomized adult female rats by the test of the modifications of the vaginal cytology. The compound has been administered in a single dose both by the subcutaneous and oral routes.

The Table below shows the Minimum Effective Doses (MED) which represents the minimum quantity of the substance necessary to cause proestrus or estrus in one out of three animals. The Table also shows the ratio of MED by oral route to MED by subcutaneous route. In consideration of the chemical structure, the estrogenic activity of the compounds of the invention has been compared with the activity of estradiol and estron taken as standard compounds.

TABLE

| COMPOUND | Estrogenic activity (MED) μg/female rat | | os/subcutaneous |
|---|---|---|---|
| | subcutaneous | oral | |
| 1,3,5(10)-estratriene-3,17β-diol(estradiol) | 0.3 | 30 | 100 |
| 7ξ-nitro-1,3,5(10)-estratriene-3,17β-diol-6-one 17-acetate | 30 | 30 | 1 |
| 7ξ-nitro-1,3,5(10)-estratriene-3,6ξ,17β-triol-3,17-diacetate | 30 | 10–30 | 1–0.3 |
| 7ξ-nitro1,3,5(10)-estratriene-3,17β-diol-6-one 3,17-diacetate | 10 | 10 | 1 |
| 7ξ-nitro-1,3,5(10)-estratriene-3,6ξ,17β-triol-3,17-diacetate-6-nitrate | 30 | 30 | 1 |
| 3-methoxy-7ξ-nitro-1,3,5(10)-estratriene-6ξ,17β-diol-17-acetate | 30 | 30 | 1 |
| 3-methoxy-7ξ-nitro-1,3,5(10)-estratriene-17β-ol-6-one-acetate | >100 | 100 | >1 |
| 3-methoxy-7ξ-nitro-1,3,5(10)-estratriene-17β-ol-17α-ethynyl-6-one | 100 | 100 | 1 |
| 1,3,5(10)-estratriene-3-ol-17-one (estrone) | 3 | 100 | 33.3 |
| 7ξ-nitro-1,3,5(10)-estratriene-3-ol-6,17-dione 3-acetate | 100 | 100 | 1 |
| 3-methoxy-7ξ-nitro-1,3,5(10)-estratriene-6,17-dione | 100 | 100 | 1 |
| 3-methoxy-7ξ-nitro-1,3,5(10)-estratriene-6ξ-ol-17-one | 30 | 30 | 1 |
| 3-methoxy-7ξ-nitro-17α-ethynyl-1,3,5(10)-estratriene-17β-ol-6-one | 100 | 100 | 1 |

From the Table, it clearly appears that all the products belonging to the above mentioned class of 7ξ-nitroestratrienes, are characterized by a ratio of estrogenic activity by oral route to estrogenic activity by subcutaneous route remarkably lower than that corresponding to estradiol and estrone which chemically are closely related compounds. This ratio is generally represented by the unity.

The following Examples serve to illustrate the invention without limiting it.

EXAMPLE 1

Nitration of 1,3,5(10),6-estratetraene-3,17β-diol-diacetate 600 mg of 1,3,5(10),6-estratetraene-3,17β-diol-diacetate were dissolved in 20 cc of anhydrous ethyl ether. 4.5 cc of fuming nitric acid (density 1.52) were added to the solution cooled to 0° C under shaking and maintaining the temperature not above 0° C. When the nitric acid addition was over, the mixture was shaken for another 30 minutes at 0° C. The solution was neutralized with 5 percent sodium bicarbonate and the steroid was extracted with ether. The extracts were washed with 5 percent sodium bicarbonate, with water until neutrality, dried over anhydrous sodium sulfate and then evaporated to dryness. By chromatographic purification there were isolated: 7ξ-nitro-1,3,5(10)-estratriene-3,17β-diol-6-one diacetate which, on crystallization from acetone-petroleum ether, melts at 183°–186° C. $\lambda_{max}^{EtOH}$ 255 and 305 mμ; ε10.180 and 2.200; $\alpha_D^{20}$=+41° (CHCl₃);

7ξ-nitro-1,3,5(10)-estratriene-3,6ξ,17β-triol-3,17-diacetate-6-nitrate, which was crystallized from ethylether-petroleum ether and melts at 168°–170° C, $\lambda_{max}^{EtOH}$ 272 and 278 mμ; ε1.100 and 1.000;

7ξ-nitro-1,3,5(10)-estratriene-3,6ξ-17β-triol-3,17-diacetate which was crystallized from chloroform-ethyl ether-petroleum ether and melts at 202°–206° C, $\lambda_{max}^{EtOH}$ 275.5 and 278 mμ; ε700 and 830; and 7ξ-nitro-1,3,5(10)-estratriene-3,17β-diol-6-one 17-acetate which melts at 252°–257° C, $\lambda_{max}^{EtOH}$ 264 mμ.

EXAMPLE 2

Nitration of 1,3,5(10),6-estratetraene-3-ol-17-one acetate 5 cc of fuming nitric acid (density 1.52) was added in 10 minutes to 1.7 g of 1,3,5(10),6-estratetraene-3-ol-17-one acetate in 50 cc of anhydrous ethyl ether cooled to 0° C. The solution was shaken at 0° C for 15 minutes, poured into 5 percent sodium bicarbonate solution. The steroid is extracted with ether. The extracts were washed with water, dried over anhydrous sodium sulfate and evaporated to dryness. The residue was purified chromatographically to give: 7ξ-nitro-1,3,5(10)-estratriene-3-ol-6,17-dione acetate which, crystallized from acetone-ethyl ether-petroleum ether, melts at 251°–253° C, $\lambda_{max}^{EtOH}$ 255 and 305 mμ, ε10.300 and 2.300, $\alpha_D^{20°}$ =+143.6° (CHCl$_3$);

7ξ-nitro-1,3,5(10)-estratriene-3,6ξ-diol-17-one-3-acetate; and 7ξ-nitro-1,3,5(10)-estratriene-3,6ξ-diol-17-one-3-acetate-6-nitrate.

EXAMPLE 3

Nitration of 3-Methoxy-1,3,5(10),6-estratetraene-17β-ol-acetate

The operation was as described in Example 2, buth employing as the starting material, 3-methoxy-1,3,5(10),6-estratetraene-17β-ol-acetate, melting point 99°–101° C (obtained from the reaction of 1,3,5(10),6-estratetraene-3,17β-diol-17-acetate with diazomethane). By chromatographic purification over Florisil (Registered Trade Mark) there were isolated: 3-methoxy--7ξ-nitro-1,3,5(10)-estratriene-17β-ol-6-one acetate which, crystallized from acetone-ethyl ether-petroleum ether melts at 178°–180° C, $\lambda_{max}^{EtOH}$ 262 and 331.5 mμ, ε8.200 and 2.870;

3-methoxy-7ξ-nitro-1,3,5(10)-estratriene-6ξ,17β-diol-17-acetate which when crystallized from acetone petroleum ether melts at 189°–192° C, $\lambda_{max}^{EtOH}$ 280 and 288 mμ, ε2.100 and 1.900 and 3-methoxy-7ξ-nitro-1,3,5(10)-estratriene-6ξ,17β-diol-17-acetate-6-nitrate.

EXAMPLE 4

Nitration of 3-methoxy- 1,3,5(10)6-estratetraene-17-one

The operation was carried out as in Example 2, but employing as the starting material 3-methoxy-1,3,5(10),6-estratetraene-17-one. After chromatography over Florisin, there were isolated: 3-methoxy-7ξ-nitro-1,3,5(10)-estratriene-6,17-dione which crystallized from acetone-ethyl ether-petroleum ether, melts at 203°–205° C, $\lambda_{max}^{EtOH}$ 261 and 332 mμ, ε9.600 and 3.160;

3-methoxy-7ξ-nitro-1,3,5(10)-estratriene-6ξ-ol-17-one which, crystallized from acetone-petroleum ether melts at 203°–205° C, $\lambda_{max}^{EtOH}$ 278 and 283 mμ, ε1.860 and 1.780; and 3-methoxy-7ξ-nitro-1,3,5(10)-estratriene-6ξ-ol-17-one-6-nitrate.

EXAMPLE 5

Nitration of 3-Methoxy-17α-ethynyl-1,3,5(10),6-estratetraene-17β-ol 4.95 cc of fuming nitric acid (density: 1.52) were added under shaking and during 10 minutes to a solution of 1.6 g of 3-methoxy-17α-ethynyl-1,3,5(10),6-estratetraene-17β-ol in 50 cc of anhydrous ether cooled to 0° C. After 10 minutes further at 0° C, the solution was poured into 300 cc of 5 percent aqueous sodium bicarbonate and then extracted with ethyl ether. The extracts were washed with water to neutrality. After evaporation of ethyl ether, the residue obtained was chromatographied on 60 g of Florisil and 3-methoxy-7ξ-nitro-17α-ethynyl-1,3,5(10)-estra-triene-17β-ol-6-one were isolated, which after purification through silica gel and crystallization from acetone-petroleum ether melts at 108°–111° C; $\lambda_{max}^{EtOH}$ 261 (ε4925) and 322(ε1435)mμ; IR 3420, 3300, 1700, 1565 cm$^{-1}$; and 3-methoxy-7ξ-nitro-17α-ethynyl-1,3,5(10)-estratriene-6ξ,17β-diol having $\lambda_{max}^{EtOH}$ 281 mμ and a flex at 288 mμ; IR 3400, 3300, 1550 cm$^{-1}$.

We claim:

1. Nitro-steroids of the formula:

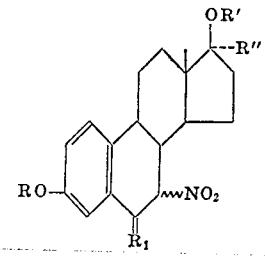

wherein R is selected from the group consisting of hydrogen, and alkyl having from one to four carbon atoms, R' is selected from the group consisting of hydrogen and an aliphatic acyl radical containing from one to four carbon atoms; R'' is selected from the group consisting of hydrogen, ethynyl and butynyl; OR' =O; and R$_1$ is selected from the group consisting of

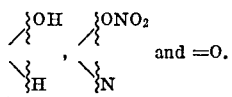

2. The compound of claim 2 which is 7ξ-nitro-1,3,5(10)-estratriene-3,17β-diol-6-one diacetate.

3. The compound of claim 2 which is 7ξ-nitro-1,3,5(10)-estratriene-3,6ξ,17β-triol-3,17-diacetate-6-nitrate.

4. The compound of claim 2 which is 7ξ-nitro-1,3,5(10)-estratriene-3,6ξ,17β-triol-3,17-diacetate.

5. The compound of claim 2 which is 7ξ-nitro-1,3,5(10)-estratriene-3-ol-6,17-dione acetate.

6. The compound of claim 2 which is 7ξ-nitro-1,3,5(10)-estratriene-3,17β-diol-6-one 17-acetate.

7. The compound of claim 2 which is 7ξ-nitro-1,3,5(10)-estratriene-3,6ξ-diol-17-one-3-acetate.

8. The compound of claim 2 which is 7ξ-nitro-1,3,5(10)-estratriene-3,6ξ-diol-17-one-3-acetate-6-nitrate.

9. The compound of claim 2 which is 3-methoxy-7ξ-nitro-1,3,5(10)-estratriene-17β-ol-6-one acetate.

10. The compound of claim 2 which is 3-methoxy-7ξ-nitro-1,3,5(10)-estratriene-6ξ,17β-diol-17-acetate.

11. The compound of claim 2 which is 3-methoxy--7ξ-nitro-1,3,5(10)-estratriene-6ξ,17β-diol-17-acetate-6-nitrate.

12. The compound of claim 2 which is 3-methoxy-7ξ-nitro-1,3,5(10)-estratriene-6,17-dione.

13. The compound of claim 2 which is 3-methoxy-7ξ-nitro-1,3,5(10)-estratriene-6ξ-ol-17-one.

14. The compound of claim 2 which is 3-methoxy-7ξ-nitro-1,3,5(10)-estratriene-6ξ-ol-17-one-6-nitrate.

15. The compound of claim 2 which is 3-methoxy-7ξ-nitro-17α-ethynyl-1,3,5(10)-estratriene-17β-ol-6-one.

16. The compound of claim 2 which is 3-methoxy-7ξ-nitro-17α-ethynyl-1,3,5(10)-estratriene-6ξ,17β-diol.

* * * * *